United States Patent
Onda et al.

(10) Patent No.: US 11,435,582 B2
(45) Date of Patent: Sep. 6, 2022

(54) VIRTUAL IMAGE DISPLAY DEVICE

(71) Applicant: DENSO CORPORATION, Kariya (JP)

(72) Inventors: Kazuhisa Onda, Kariya (JP); Hiroshi Ando, Kariya (JP)

(73) Assignee: DENSO CORPORATION, Kariya (JP)

( * ) Notice: Subject to any disclaimer, the term of this patent is extended or adjusted under 35 U.S.C. 154(b) by 437 days.

(21) Appl. No.: 16/589,458

(22) Filed: Oct. 1, 2019

(65) Prior Publication Data

US 2020/0117002 A1    Apr. 16, 2020

(30) Foreign Application Priority Data

Oct. 10, 2018 (JP) .............................. JP2018-191832

(51) Int. Cl.
*G02B 27/01* (2006.01)
*B60K 35/00* (2006.01)

(52) U.S. Cl.
CPC .......... *G02B 27/0103* (2013.01); *B60K 35/00* (2013.01); *B60K 2370/1529* (2019.05); *B60K 2370/167* (2019.05); *B60K 2370/31* (2019.05); *G02B 2027/011* (2013.01)

(58) Field of Classification Search
None
See application file for complete search history.

(56) References Cited

U.S. PATENT DOCUMENTS

| | | | |
|---|---|---|---|
| 4,613,200 A | 9/1986 | Hallinan | |
| 4,832,427 A * | 5/1989 | Nanba | G02B 27/0103 359/24 |
| 5,210,626 A * | 5/1993 | Kumayama | G02B 27/0103 345/9 |
| 5,497,170 A * | 3/1996 | Kato | G02B 5/32 345/9 |
| 8,804,247 B2 * | 8/2014 | Sugiyama | B60K 35/00 359/13 |

FOREIGN PATENT DOCUMENTS

| | | | |
|---|---|---|---|
| JP | H06167671 A | * | 6/1994 |
| JP | H07-285357 A | | 10/1995 |

* cited by examiner

*Primary Examiner* — Derek S. Chapel
(74) *Attorney, Agent, or Firm* — Posz Law Group, PLC

(57) ABSTRACT

First and second diffractive reflective elements form an optical path that guides a display light from a display unit toward a projection portion. The first diffractive reflective element is placed on the optical path to reflect the display light toward the projection portion by causing diffraction such that an incident angle and an emission angle of the display light are different from each other. The second diffractive reflective element is placed between the display unit and the first diffractive reflective element on the optical path to reflect the display light from the display unit toward the first diffractive reflective element by causing diffraction such that an incident angle and an emission angle of the display light are different from each other.

9 Claims, 7 Drawing Sheets

VIRTUAL IMAGE DISPLAY DEVICE

CROSS REFERENCE TO RELATED APPLICATION

The present application claims the benefit of priority from Japanese Patent Application No. 2018-191832 filed on Oct. 10, 2018. The entire disclosures of all of the above applications are incorporated herein by reference.

TECHNICAL FIELD

The present disclosure relates to a virtual image display device.

BACKGROUND

Conventionally, a known virtual image display device mounted on a vehicle is configured to project an image on a windshield to indicate a virtual image.

SUMMARY

According to an aspect of the present disclosure, a virtual image display device is configured to be mounted on a vehicle and to project an image on a projection portion to display the image as a virtual image to be visible. The virtual image display device includes a display unit and a light guide unit. The display unit is configured to emit a display light of the image including a light having a reference wavelength and a light having a wavelength different from the reference wavelength. The light guide unit is configured to form an optical path that guides the display light emitted from the display unit toward the projection portion. The light guide unit includes a diffractive reflective element configured to reflect the display light by causing diffraction such that an incident angle and an emission angle of the display light are different from each other.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
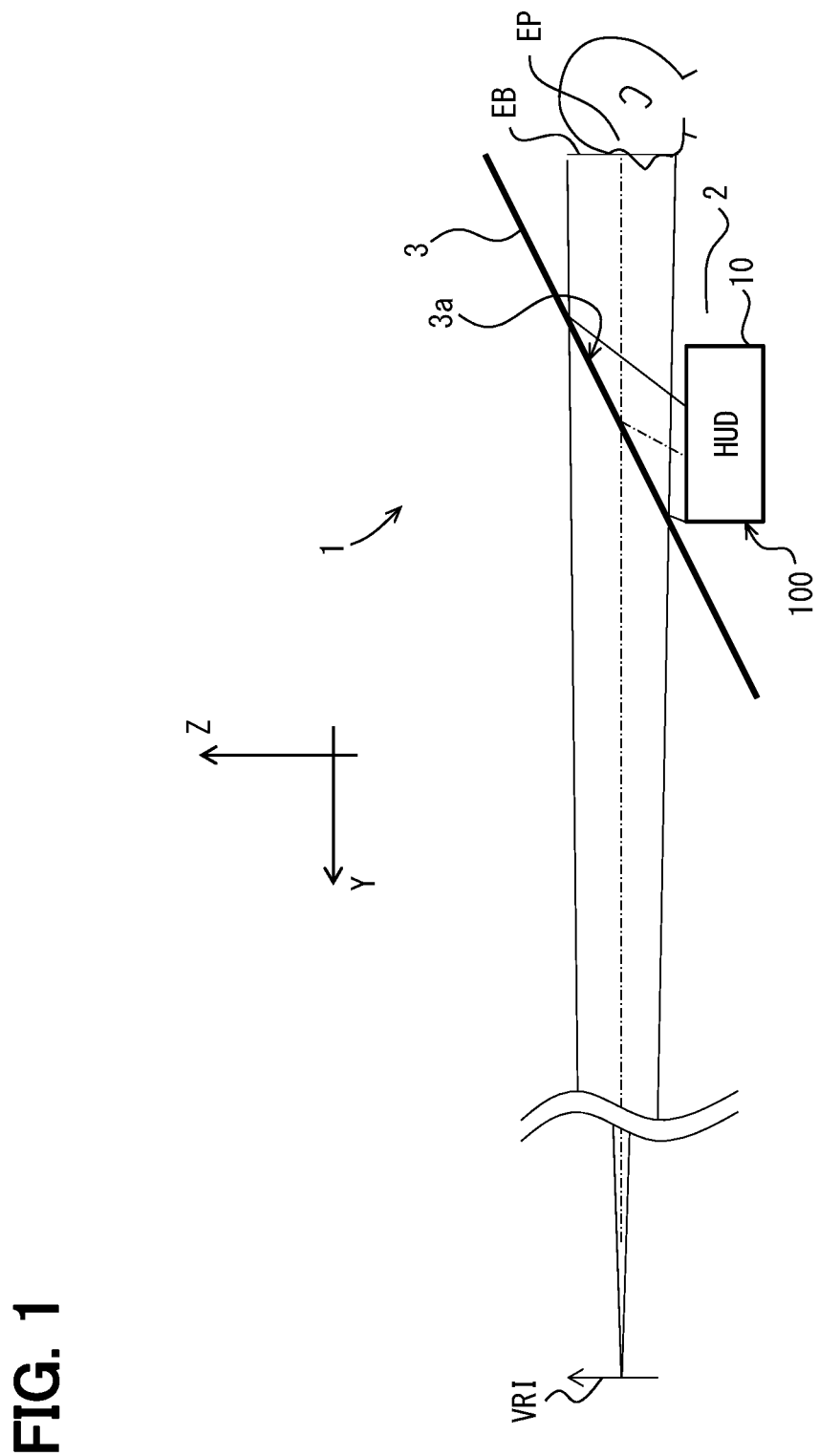
FIG. 1 is a schematic view showing an HUD device mounted on a vehicle according to a first embodiment.

Hereinafter, an example of the present disclosure will be described. A virtual image display device according to this example is configured to be mounted on a vehicle and to project an image on a projection portion to display a virtual image to be visible. The virtual image display device having an assumed configuration includes a display unit and a light guide unit. The light guide unit defines an optical path that guides a display light emitted from the display unit to the projection portion.

The light guide includes a first hologram and a second hologram. The first hologram enlarges a diffraction image in an x direction. The second hologram enlarges the diffraction image in a y direction that is substantially perpendicular to the x direction.

In this assumed configuration, it is conceivable to reduce the size of the light guide unit by employing a hologram for the light guide unit. However, in this assumable configuration, in a case where the diffraction image is enlarged in the x direction by using the first hologram, chromatic aberration arises in the x direction. Further, in a case where the diffraction image is enlarged in the y direction by using the second hologram, chromatic aberration arises in the y direction. As a result, a large amount of chromatic aberration in the x and y directions remains in the virtual image. Therefore, it is assumable that the virtual image does not exhibit sufficient visibility.

According to one example of the present disclosure, a virtual image display device is configured to be mounted on a vehicle and to project an image on a projection portion to display the image as a virtual image to be visible. The virtual image display device includes a display unit and a light guide unit. The display unit is configured to emit a display light of the image including a light having a reference wavelength and a light having a wavelength different from the reference wavelength. The light guide unit is configured to form an optical path that guides the display light emitted from the display unit toward the projection portion. The light guide unit includes a projection-portion-side diffractive reflective element and a display-unit-side diffractive reflective element. The projection-portion-side diffractive reflective element is placed on the optical path and configured to reflect the display light toward the projection portion by causing diffraction such that an incident angle and an emission angle of the display light are different from each other. The display-unit-side diffractive reflective element is placed between the display unit and the projection-portion-side diffractive reflective element on the optical path. The display-unit-side diffractive reflective element is configured to reflect the display light from the display unit toward the projection-portion-side diffractive reflective element by causing diffraction such that an incident angle and an emission angle of the display light are different from each other. In a cross section taken along a vertical plane of the vehicle, an emission angle of a light having the reference wavelength reflected on the projection-portion-side diffractive reflective element with diffraction toward the projection portion is defined as an angle θ1. In the cross section, an incident angle of the light having the reference wavelength incident on the projection-portion-side diffractive reflective element from the display-unit-side diffractive reflective element is defined as an angle $\theta2$. In the cross section, an emission angle of the light having the reference wavelength reflected on the display-unit-side diffractive reflective element with diffraction toward the projection-portion-side diffractive reflective element is defined as an angle $\theta3$. In the cross section, an incident angle of the light having the reference wavelength incident on the display-unit-side diffractive reflective element from the display unit is defined as $\theta4$. The angle $\theta1$ is smaller than the angle $\theta2$, and the angle $\theta3$ is larger than the angle $\theta4$.

According to this example, first, the angle $\theta3$ is larger than the angle $\theta4$ in the reflection of the display light on the display-unit-side diffractive reflective element. In short, the angle $\theta3$ is a larger angle than that of the regular reflection. Therefore, in a case where the other wavelength is longer than the reference wavelength, the color shift arises such that the reflection angle of the light of the other wavelength becomes larger than the angle $\theta3$. In a case where the other wavelength is shorter than the reference wavelength, the color shift arises such that the reflection angle of the light of the other wavelength becomes smaller than the angle $\theta3$.

Second, the angle $\theta1$ is smaller than the angle $\theta2$ in the reflection of the display light on the projection-portion-side diffractive reflective element. In short, the angle $\theta1$ is smaller than the angle in the regular reflection. Therefore, in a case where the other wavelength is longer than the reference wavelength, the color shift arises such that the reflection angle of the light of the other wavelength is smaller than $\theta1$. In a case where the other wavelength is shorter than the reference wavelength, the color shift arises such that the reflection angle of the light of the other wavelength is larger than $\theta1$.

That is, the color shift of the display light having the other wavelength with respect to the display light having the reference wavelength caused in the reflection on the display-unit-side diffractive reflective element and the color shift of the display light having the other wavelength with respect to the display light having the reference wavelength caused in the reflection on the projection-portion-side diffractive reflective element are opposite to each other in the color shift direction. Therefore, the chromatic aberration in the cross section along the vertical plane can be cancelled at least in part on both the reflections on the diffractive reflective elements. Therefore, the chromatic aberration in the vertical direction can be reduced also in the virtual image. In this way, the visibility of the virtual image can be enhanced.

Further, the angle $\theta2$ is larger than the angle $\theta1$. Therefore, in the reflection of the display light on the display-unit-side diffractive reflective element, the optical path width of the display light incident at the angle $\theta2$ can be reduced with respect to the optical path width of the display light reflected at the angle $\theta1$. This compression effect of the optical path width enables to reduce the size of the display-unit-side diffractive reflective element that is placed closer to the display device than the projection portion diffractive reflective element relatively on the optical path. Therefore, the compression effect enables to restrain increase in the size of the HUD device and enhances mountability of the HUD device to the vehicle.

As described above, the configuration enables to produce the virtual image display device satisfying both the mountability to the vehicle and visibility of the virtual image.

According to another example of the present disclosure, a virtual image display device is configured to be mounted on a vehicle and to project an image on a projection portion to display the image as a virtual image to be visible. The virtual image display device includes a display unit and a light guide unit. The display unit is configured to emit a display light of the image including a light having a reference wavelength and a light having a wavelength different from the reference wavelength. The light guide unit is configured to form an optical path that guides the display light emitted from the display unit toward the projection portion. The light guide unit includes a projection-portion-side diffractive reflective element and a display-unit-side diffractive reflective element. The projection-portion-side diffractive reflective element is placed on the optical path and configured to reflect the display light toward the projection portion by causing diffraction such that an incident angle and an emission angle of the display light are different from each other. The display-unit-side diffractive reflective element is placed between the display unit and the projection-portion-side diffractive reflective element on the optical path. The display-unit-side diffractive reflective element is configured to reflect the display light from the display unit toward the projection-portion-side diffractive reflective element by causing diffraction such that an incident angle and an emission angle of the display light are different from each other. In a cross section taken along a horizontal plane of the vehicle, an emission angle of a light having the reference wavelength reflected on the projection-portion-side diffractive reflective element with diffraction toward the projection portion is defined as an angle $\theta5$. In the cross section, an incident angle of the light having the reference wavelength incident on the projection-portion-side diffractive reflective element from the display-unit-side diffractive reflective element is defined as an angle $\theta6$. In the cross section, an emission angle of the light having the reference wavelength reflected on the display-unit-side diffractive reflective element with diffraction toward the projection-portion-side diffractive reflective element is defined as an angle $\theta7$. In the cross section, an incident angle of the light having the reference wavelength incident on the display-unit-side diffractive reflective element from the display unit is defined as $\theta8$. The angle $\theta5$ is smaller than the angle $\theta6$, and the angle $\theta7$ is smaller than the angle $\theta8$.

According to this example, first, the angle $\theta7$ is smaller than the angle $\theta8$ in the reflection of the display light on the display-unit-side diffractive reflective element. In short, the angle $\theta7$ is smaller than the angle in the regular reflection. Therefore, in a case where the other wavelength is longer than the reference wavelength, the color shift arises such that the reflection angle of the light of the other wavelength is smaller than $\theta7$. In a case where the other wavelength is shorter than the reference wavelength, the color shift arises such that the reflection angle of the light of the other wavelength is larger than $\theta7$.

Second, the angle $\theta5$ is smaller than the angle $\theta6$ in the reflection of the display light on the projection-portion-side diffractive reflective element. In short, the angle $\theta5$ is smaller than the angle in the regular reflection. Therefore, in a case where the other wavelength is longer than the reference wavelength, the color shift arises such that the reflection angle of the light of the other wavelength is smaller than $\theta5$. In a case where the other wavelength is shorter than the reference wavelength, the color shift arises such that the reflection angle of the light of the other wavelength is larger than $\theta5$.

That is, the color shift of the display light having the other wavelength with respect to the display light having the reference wavelength caused in the reflection on the display-unit-side diffractive reflective element and the color shift of the display light having the other wavelength with respect to the display light having the reference wavelength caused in the reflection on the projection-portion-side diffractive reflective element are opposite to each other in the color shift direction. Therefore, the chromatic aberration in the cross section along the horizontal plane can be cancelled at least in part on both the reflections on the diffractive reflective elements. Therefore, the chromatic aberration in the horizontal direction can be reduced also in the virtual image. In this way, the visibility of the virtual image can be enhanced.

Further, the angle θ6 is larger than the angle θ5. Therefore, in the reflection of the display light on the display-unit-side diffractive reflective element, the optical path width of the display light incident at the angle θ6 can be reduced with respect to the optical path width of the display light reflected at the angle θ5. This compression effect of the optical path width enables to reduce the size of the display-unit-side diffractive reflective element that is placed closer to the display device than the projection portion diffractive reflective element relatively on the optical path. Therefore, the compression effect enables to restrain increase in the size of the HUD device and enhances mountability of the HUD device to the vehicle.

As described above, the configuration enables to produce the virtual image display device satisfying both the mountability to the vehicle and visibility of the virtual image.

Hereinafter, multiple embodiments will be described with reference to the drawings. It should be noted that the same reference numerals are assigned to the corresponding components respectively in the respective embodiments, so that duplicative descriptions may be omitted. When only a part of the configuration is described in the respective embodiments, the configuration of the other embodiments described before may be applied to other parts of the configuration. Further, not only the combinations of the configurations explicitly shown in the description of the respective embodiments, but also the configurations of the plurality of embodiments can be partially combined even when they are not explicitly shown as long as there is no difficulty in the combination in particular.

First Embodiment

As shown in FIG. 1, a virtual image display device according to a first embodiment of the present disclosure is configured to be mounted on an automotive as a vehicle 1. The virtual image display device housed in an instrument panel 2 of the vehicle 1 is a head-up display device (hereinafter referred to as an HUD device) 100. Herein, the wording of "vehicle" is broadly construed to include various vehicles such as an aircraft, a ship, and a game console body, which does not move, in addition to an automotive and a railway vehicle.

The HUD device 100 projects a display light of an image toward the projection portion 3a defined on a windshield 3 of the vehicle 1. In this way, the HUD device 100 displays a virtual image so that the image is visible by an occupant as a viewer of the vehicle 1. In other words, the display light of the image reflected on the windshield 3 reaches a visible region EB defined in the interior of the vehicle 1. An occupant whose eye point EP is located in the visible region EB perceives the display light as a virtual image VRI. The occupant is enabled to recognize various types of information displayed as the virtual image VRI. The various types of information, which is displayed as the virtual image, may be exemplified by information that represents a state of the vehicle 1 such as a vehicle speed and/or a remaining fuel. The information may be further exemplified by visibility assisting information and/or navigation information such as road information.

In the following description, unless otherwise noted, the directions indicated by the front, rear, upper, lower, left, and right are denoted with respect to the vehicle 1 on the horizontal plane. Then, as described in the drawings, the three-dimensional coordinates are defined such that the X axis is along the left-right direction, the Y axis is along the front-rear direction, and the Z axis is along the up-down direction.

The windshield 3 of the vehicle 1 is formed of, for example, a synthetic resin or a glass to be a translucent plate. The windshield 3 is placed above the instrument panel 2. The windshield 3 is inclined such that the closer to the rear relative to the front, the more the windshield 3 is distant from the instrument panel 2. The windshield 3 has a projection portion 3a on which the display light is projected. The projection portion 3a is in a smooth concave shape or in a planar shape. The projection portion 3a may not be provided on the windshield 3. For example, a combiner, which is a separate component from the vehicle 1, may be placed on an upper surface of the instrument panel 2, and the projection portion 3a may be provided to the combiner.

The visible region EB is a spatial region that is visually recognizable such that the virtual image VRI displayed by the HUD device 100 satisfies a predetermined standard in a case where, for example, the entirety of the virtual image VRI has a predetermined luminance or higher. The visible region EB is also referred to as an eye box. Typically, the visual recognition region EB is defined so as to overlap with an eyelips that is defined in the vehicle 1. The eyelips is in an ellipsoidal form defined based on an eye range that statistically represents a spatial distribution of the eye point EP of an occupant.

Figure 2:
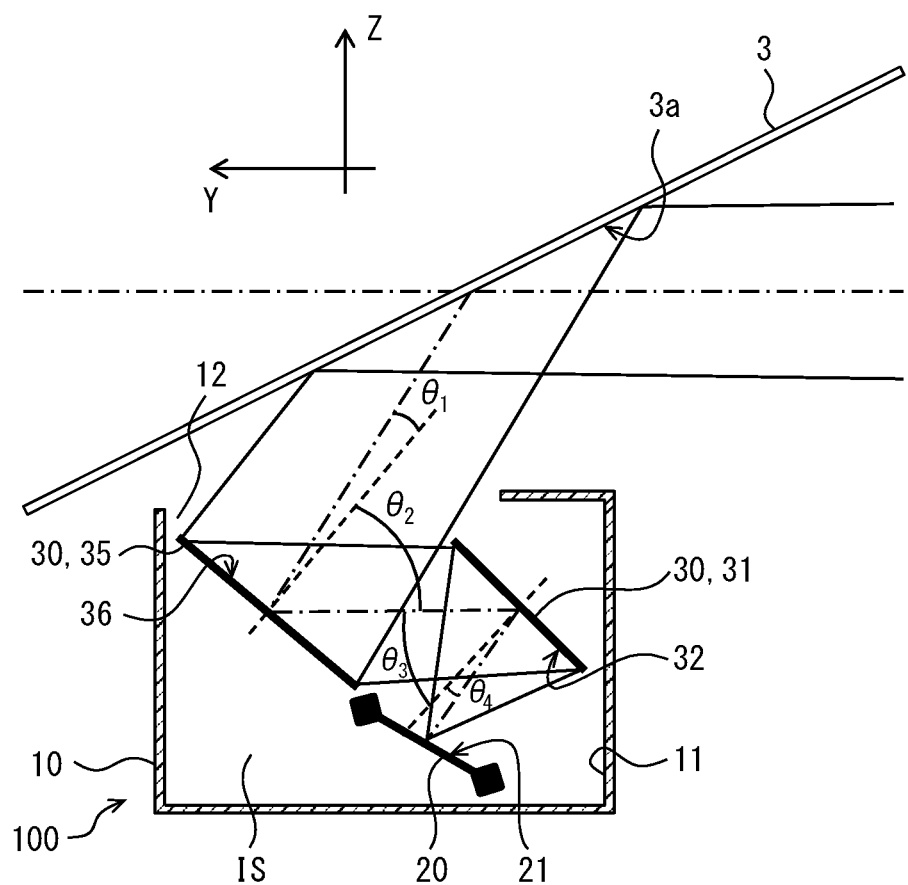
FIG. 2 is a sectional view schematically showing a YZ cross section of the HUD device according to the first embodiment.

The detailed configuration of the HUD device 100 will be described below with reference to FIG. 2 additionally. The HUD device 100 includes a case 10, a display unit 20, a light guide unit 30, and the like.

The case 10 is formed of a wall portion 11 that has a light-shielding property and is made of, for example, a synthetic resin to be in a hollow box shape in which an internal space IS is formed. The case 10 accommodates and holds the display unit 20, a control board that controls the display unit 20, the light guide unit 30, and the like in the internal space IS. An upper part of the case 10 that faces the projection portion 3a in the vertical direction has a window portion 12. The window portion 12 is optically opened for transmitting the display light. The window portion 12 may be physically open or may be covered with a translucent dust-proof sheet that is in a thin plate shape.

The display unit 20 displays the image on a real image surface 21. The image is to be formed as the virtual image VRI. The display unit 20 may employ various types of displays, such as a liquid crystal display, an EL display, a laser scanner display, or a digital light processing display (DLP display (registered trademark)). The liquid crystal display displays an image by using a transmissive or reflective liquid crystal panel. The EL display emits light by itself by causing electroluminescence. The DLP display uses a digital micromirror device (DMD). In particular, the display unit 20 of the present embodiment displays a color image and emits a display light, in which a red light, a green light, and a blue light are combined, to the light guide unit. The display device 20 may emit a white light, which includes lights having wavelengths in a visible range, as the display light.

The display device 20 of the present embodiment is placed on the lower side in the internal space IS of the case 10 and emits the display light in an oblique direction upward and rearward.

The light guide unit 30 forms an optical path that guides the display light emitted from the display unit 20 toward the projection portion 3a outside the device. The light guide unit 30 of this embodiment has two diffractive reflective elements 31 and 35. The diffractive reflective element 31 is also referred to as a display unit-side diffractive reflective element. The diffractive reflective element 35 is also referred to as a projection portion-side diffractive reflective element.

Each of the diffractive reflective elements 31 and 35 has a diffractive structure and is configured to cause diffraction thereby to reflect the display light. For example, each of the diffractive reflective elements 31 and 35 of the present embodiment is an element that has a periodic refractive index distribution in its medium. Each of the diffractive reflective elements 31 and 35 is a hologram element that has a hologram layer interposed between a pair of light transmitting substrate layers and is in a thin plate shape, particularly in a flat plate shape. The periodic refractive index distribution in the hologram layers forms the diffractive structure. It could be preferable to adopt, as the hologram element, a volumetric-type hologram element in consideration of its diffraction efficiency and its wavelength dependency.

The transmission substrate layers are formed of, for example, a synthetic resin or a glass in thin plate shapes having a light transmitting property and protect and reinforce the hologram layers.

The hologram layer is formed in advance in a state where information of an amplitude and a phase of an object light is recorded as interference fringes with respect to a reference light in a hologram material. These interference fringes are caused by the above-described periodic refractive index distribution. The hologram material may be a material mainly composed of a synthetic resin, a gelatin photosensitive material, or a silver salt photosensitive material, or the like. The hologram material may be a material enabled to selectively record information of the amplitude and the phase of the object light by using a spatial modulation of the refractive index.

The diffractive reflective element 31 is placed closer to the display 20 than the diffractive reflective element 35 on the optical path. That is, the diffractive reflective element 31 is placed between the display 20 and the diffractive reflective element 35 on the optical path. The hologram layer of the diffractive reflective element 31 is formed with interference fringes that cause Bragg reflection of the display light. For example, the modulation direction in the interference fringes, in which the refractive index is modulated, is set to a direction that obliquely intersects a surface 32 of the diffractive reflective element 31. In this configuration, in the first-order diffracted light having the highest diffraction efficiency among the diffraction orders, the incident angle and the emission angle are different from each other with respect to the normal line of the surface 32.

The diffractive reflective element 35 is placed on the side of the projection portion 3a with respect to the diffractive reflective element 31 on the optical path. That is, the diffractive reflective element 35 is placed between the diffractive reflective element 31 and the window portion 12 on the optical path. The hologram layer of the diffractive reflective element 35 is also formed with interference fringes that cause Bragg reflection of the display light. For example, the modulation direction in the interference fringes, in which the refractive index is modulated, is set to a direction that obliquely intersects a surface 36 of the diffractive reflective element 35. Accordingly, the incident angle and the emission angle of the first-order diffracted light with respect to the normal line of the surface 36 are different from each other.

In this way, the display light emitted from the display device 20 is reflected by the diffraction caused in the diffractive reflective element 31 and the diffractive reflective element 35 in this order on the optical path formed with the light guide unit 30. Thus, the display light is projected on the projection portion 3a.

In the present embodiment, the diffractive reflective element 31 and the diffractive reflective element 35 are shifted from each other along a tangential direction of the surfaces 32 and 36 such that that the surfaces 32 and 36 do not face each other. The diffractive reflective element 31 faces the display device 20 in the vertical direction. The diffractive reflective element 35 faces the projection portion 3a in the vertical direction. The display light from the display unit 20 is incident on the surface 32 of the diffractive reflective element 31 that faces downward and forward and is emitted from the surface 32 toward the diffractive reflective element 35. Thereafter, the display light is incident on the surface 36 of the diffractive reflective element 35 that faces upward and backward and is emitted from the surface 36 toward the projection portion 3a.

The real image surface 21 of the display 20, the surface 32 of the diffractive reflective element 31, and the surface 36 of the diffractive reflective element 35 are arranged so as not to be tilted in the width direction (left to right direction). In a cross section (that is, the YZ cross section) that is along the vertical plane of the diffractive reflective element 31 and is along the front-rear direction of the vehicle 1, display light is configured to enter the diffractive reflective element 31 obliquely. Further, in this YZ cross section of the diffractive reflective element 35, the display light is configured to enter the diffractive reflective element 35 obliquely at an angle.

Herein, the relationship between the angles $\theta 1$ to $\theta 4$ defined in the YZ cross section shown in FIG. 2 will be described. In the YZ cross section of the diffractive reflective element 31, the light having the reference wavelength is reflected by diffraction on the diffractive reflective element 35 toward the projection portion 3a at an emission angle $\theta 1$. In addition, in the YZ cross section, the light having the reference wavelength enters the diffractive reflective element 35 from the diffractive reflective element 31 at an incident angle $\theta 2$. Further, in the YZ cross section of the diffractive reflective element 31, a light having a reference wavelength is reflected on the diffractive reflective element 31 by diffraction toward the diffractive reflective element 35 at an emission angle $\theta 3$. In addition, in the YZ cross section, the light of the reference wavelength from the display device 20 enters the diffractive reflective element 31 at an incident angle $\theta 4$. The angles $\theta 1$ to $\theta 4$ in the present embodiment are defined with reference to the surfaces 32 and 36.

In the present embodiment, the light having the reference wavelength reflected at the angles $\theta 1$ and $\theta 3$ is the first-order diffracted light as described above. Various wavelength can be defined as the reference wavelength among the display light of the display 20 that is emitted and includes the light having the reference wavelength and a light having another wavelength than the reference wavelength. It is noted that, in this embodiment, the wavelength of the green light that is closest to a median value of the wavelengths of the colors is determined as the reference wavelength, and the following description will be given.

The light having the reference wavelength is reflected by the diffractive reflective elements 31 and 35 so as to travel in a zigzag shape on the YZ cross section. In this embodiment, the interference fringes of the diffractive reflective element 35 are formed so that the angle θ1 is smaller than the angle θ2. In addition, the interference fringes of the diffractive reflective element 31 are formed so that the angle θ3 is larger than the angle θ4.

Figure 3:
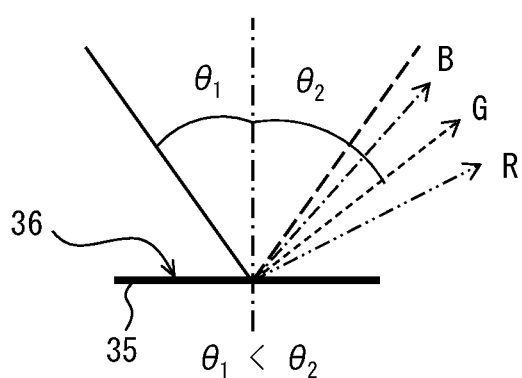
FIG. 3 is an explanatory view showing a color shift caused in a diffractive reflective element on the side of a projection portion according to the first embodiment.
Figure 4:
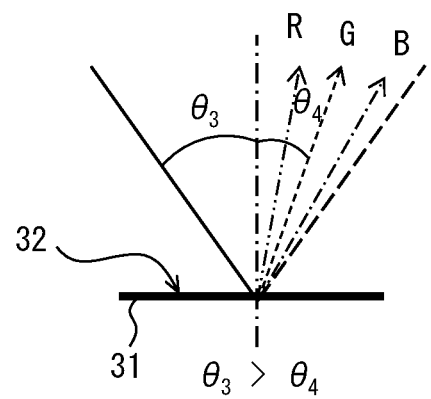
FIG. 4 is an explanatory view showing a color shift caused in the diffractive reflective element on the side of a display unit according to the first embodiment.

As follows, the incident angle the incident light and the reflection angle of the reflected light will be described with reference to FIGS. 3 and 4. In FIGS. 3 and 4, the arrows indicate a direction of an optical path from the eyelips through the diffractive reflective element 35 and 31 toward the real image surface 21. Therefore, the arrows in FIGS. 3 and 4 indicate the directions opposite to the traveling directions of the display light.

As shown in FIG. 3, in the reflection on the diffractive reflective element 35, the green light having the reference wavelength is incident at the angle θ2 and is reflected at the angle θ1. That is, the emission angle θ1 is smaller than the reflection angle θ2 in regular reflection that does not entail diffraction. In this case, a light having a longer wavelength than the reference wavelength is reflected at an emission angle smaller than the angle θ1. A light having a shorter wavelength than the reference wavelength is reflected at an emission angle larger than θ1.

Therefore, when the red light having a wavelength longer than that of the green light is incident on the diffractive reflective element 35 at the angle θ2, the red light is reflected at an emission angle smaller than the angle θ1. When the blue light having a wavelength shorter than that of the green light is incident on the diffractive reflective element 35 at the angle θ2, the blue light is reflected at an emission angle larger than the angle θ1.

As shown in FIG. 4, in the reflection on the diffractive reflective element 31, the green light having the reference wavelength is incident at the angle θ4 and is reflected at the angle θ3. That is, the emission angle θ3 is larger than the reflection angle θ2 in regular reflection that does not entail diffraction. In this case, a light having a longer wavelength than the reference wavelength is reflected at an emission angle larger than the angle θ3. A light having a shorter wavelength than the reference wavelength is reflected at an emission angle smaller than the angle θ3.

Assuming that, when the red light having a wavelength longer than that of the green light is incident on the diffractive reflective element 31 at the angle θ4, the red light is reflected at an emission angle larger than the angle θ3. Further assuming that, when the blue light having a wavelength shorter than that of the green light is incident on the diffractive reflective element 31 at the angle θ4, the blue light is reflected at an emission angle smaller than the angle θ3.

Figure 5:
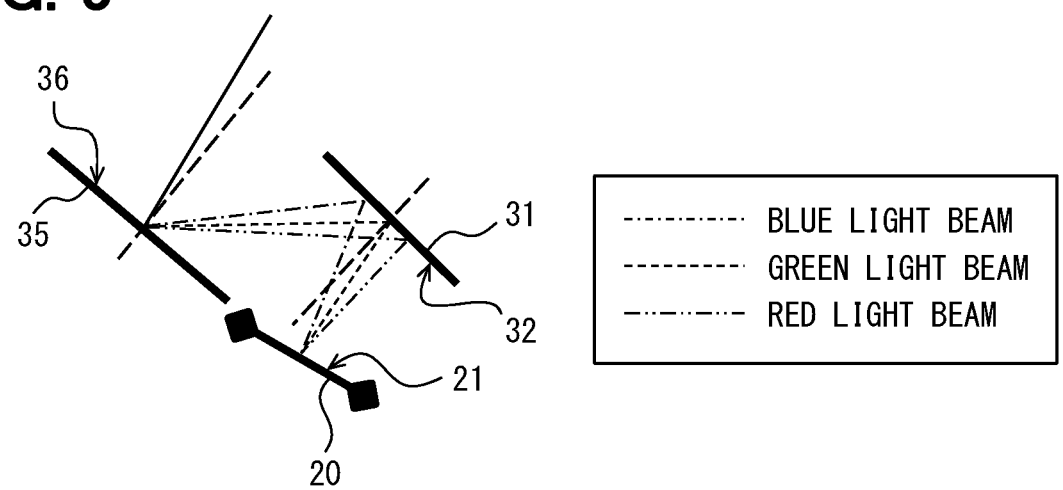
FIG. 5 is an explanatory view showing correction of color shift caused in the HUD device according to the first embodiment.

As described above, the direction of the color shift caused by the reflection on the diffractive reflective element 35 and the direction of the color shift caused by the reflection on the diffractive reflective element 31 are opposite to each other. Therefore, as shown in FIG. 5, when the display lights in those colors emitted from substantially the same portion (pixel) of the display device 20 are reflected on the diffractive reflective element 31 and on the diffractive reflective element 35 in this order, the color shifts caused in a direction of vertical plane are cancelled with each other. The direction of vertical plane corresponds to the vertical direction when the display light is displayed as the virtual image VRI. The display light is finally emitted from the light guide unit 30 with small color shift in the direction of vertical plane.

The real image surface 21 of the display 20, the surface 32 of the diffractive reflective element 31, and the surface 36 of the diffractive reflective element 35 are arranged so as not to be tilted in the width direction (left to right direction). In the cross section along the horizontal plane in the diffractive reflective element 31, that is, in the XY plane, the configuration causes the display light to enter the diffractive reflective element 31 substantially perpendicularly. Further, in the XY cross section of the diffractive reflective element 35, the configuration causes the display light to enter the diffractive reflective element 35 substantially perpendicularly. Therefore, the configuration restrains color shift in the horizontal plane direction. The horizontal plane direction corresponds to the left-right direction when the display light is displayed as the virtual image VRI. Further, by setting the difference between θ2 and θ3 to small values, the configuration enables to enhance a cancelling operation of the color offset, that is, to enhance an effect to reduce a chromatic aberration.

Furthermore, in the present embodiment, the angle θ2 is smaller than the angle θ3. Therefore, the configuration enables to further lay the diffractive reflective element 31, that is to direct the diffractive reflective element 31 further downward. Therefore, even in a configuration where the angle θ4 is reduced, the display device 20 and the diffractive reflective element 35 can be spaced from each other so as not to interfere with each other.

(Operation effect) Operation effects of the first embodiment as described above will be described below.

First, according to the first embodiment, the angle θ3 is larger than the angle θ4 in the reflection of the display light on the diffractive reflective element 31. In short, the angle θ3 is a larger angle than that of the regular reflection. Therefore, in a case where the other wavelength is longer than the reference wavelength, the color shift arises such that the reflection angle of the light of the other wavelength becomes larger than the angle θ3. In a case where the other wavelength is shorter than the reference wavelength, the color shift arises such that the reflection angle of the light of the other wavelength becomes smaller than the angle θ3.

Second, the angle θ1 is smaller than the angle θ2 in the reflection of the display light on the diffractive reflective element 35 that is placed closer to the projection portion 3a than the diffractive reflective element 31 on the optical path. In short, the angle θ1 is smaller than the angle in the regular reflection. Therefore, in a case where the other wavelength is longer than the reference wavelength, the color shift arises such that the reflection angle of the light of the other wavelength is smaller than θ1. In a case where the other wavelength is shorter than the reference wavelength, the color shift arises such that the reflection angle of the light of the other wavelength is larger than θ1.

That is, the color shift of the display light having the other wavelength with respect to the display light having the reference wavelength caused in the reflection on the diffractive reflective element 31 and the color shift of the display light having the other wavelength with respect to the display light having the reference wavelength caused in the reflection on the diffractive reflective element 35 are opposite to each other in the color shift direction. Therefore, the chromatic aberration in the cross section along the vertical plane can be cancelled at least in part on both the reflections on the diffractive reflective elements 31 and 35. Therefore, the chromatic aberration in the vertical direction can be reduced also in the virtual image VRI. In this way, the visibility of the virtual image VRI can be enhanced.

Figure 6:
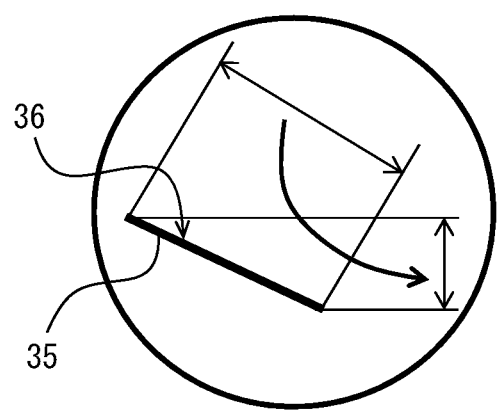
FIG. 6 is an explanatory view showing compression of a width of an optical path according to the first embodiment.

Further, the angle θ2 is larger than the angle θ1, Therefore, as shown in FIG. 6, in the reflection of the display light on the diffractive reflective element 35, the optical path width of the display light incident at the angle θ2 can be reduced with respect to the optical path width of the display light reflected at the angle θ1. This compression effect of the optical path width enables to reduce the size of the diffractive reflective element 31 that is placed closer to the display device 20 than the diffractive reflective element 35 relatively on the optical path. Therefore, the compression effect enables to restrain increase in the size of the HUD device 100 and enhances mountability of the HUD device 100 to the vehicle 1.

As described above, the configuration enables to produce the HUD device 100 satisfying both the mountability to the vehicle 1 and visibility of the virtual image VRI.

Further, according to the first embodiment, the angle θ2 is smaller than the angle θ3. Even in a case where the angle θ4 is smaller than the angle θ3, the angle θ3 may be set larger than the angle θ2. In this way, the display unit 20 can be placed away from the diffractive reflective element 35, without placing the display device 20 away from the diffractive reflective element 31. Therefore, the display unit 20 need not be placed away from the diffractive reflective element 31. Therefore, the mountability of the HUD device 100 to the vehicle 1 can be enhanced. At the same time, the configuration enables to suppress an optical interference that is caused due to excessive proximity of the display unit 20 to the diffractive reflective element 35. Therefore, visibility of the virtual image VRI can be enhanced.

Second Embodiment

Figure 7:
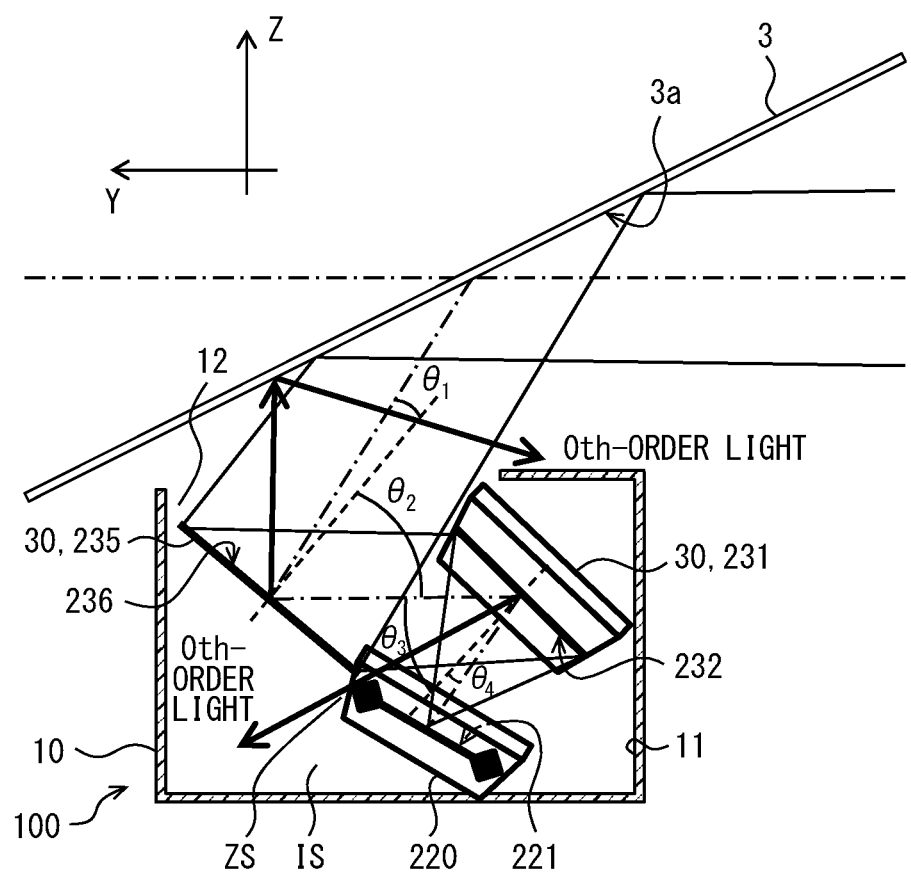
FIG. 7 is a partial cross sectional view schematically and partially showing a YZ cross section of an HUD device according to a second embodiment.
Figure 8:
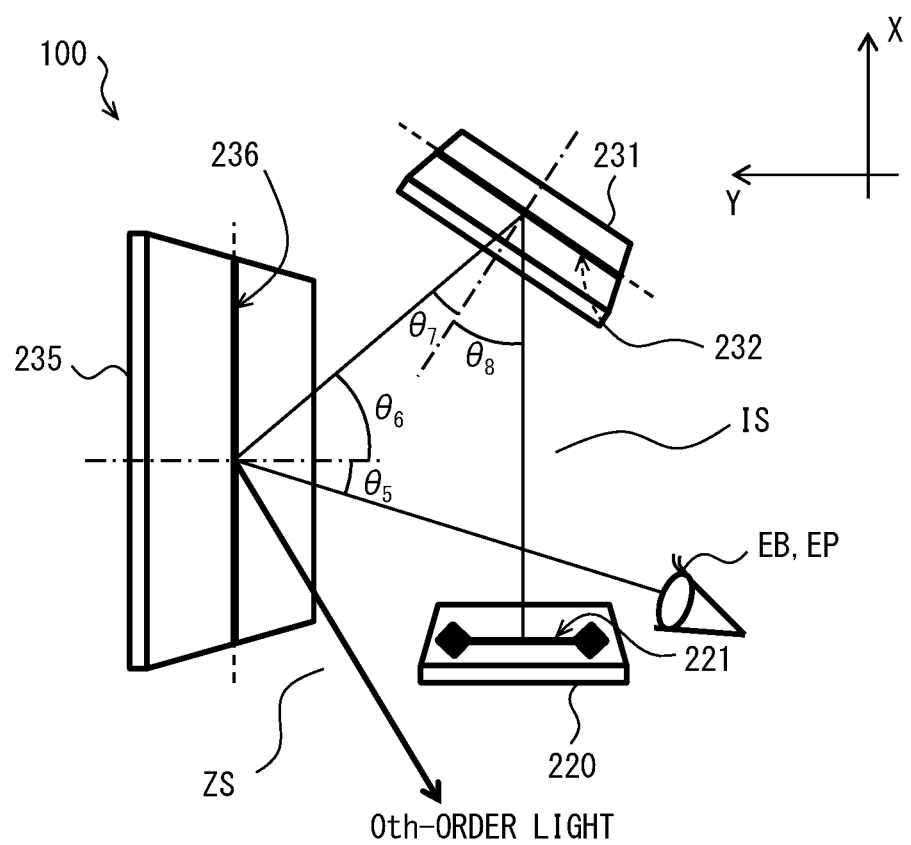
FIG. 8 is a schematic top view for explaining XY cross sections of diffraction reflective elements and a display according to the second embodiment.
Figure 9:
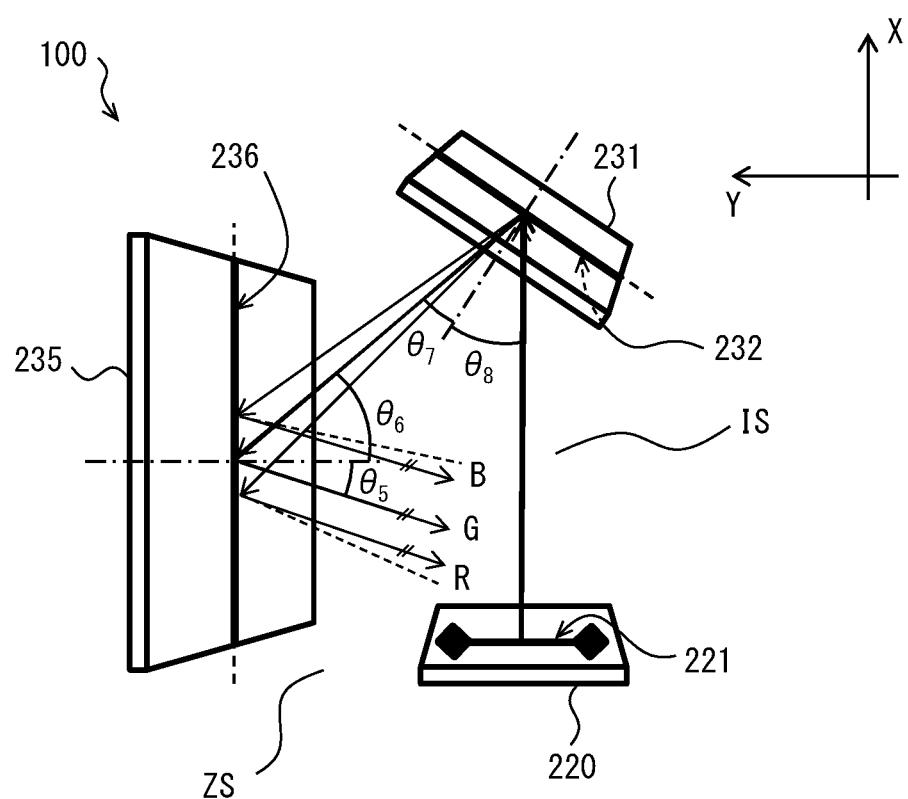
FIG. 9 is a schematic top view for explaining correction of color shift caused in the HUD device according to the second embodiment.

As shown in FIGS. 7 to 9, a second embodiment is a modification of the first embodiment. The second embodiment will be described mainly on configurations different from those of the first embodiment.

In the second embodiment, as shown in FIG. 7, a display unit 220 and diffractive reflective elements 231 and 235 are arranged such that the following relationships of the angles θ5 to θ8 are satisfied on the XY section, and such that the relationship of the angles θ1 to θ4 described in the first embodiment is satisfied.

Specifically, a real image plane 221 of the display unit 220 has a normal line that is directed upward and rightward in an oblique direction. The display unit 220 emits the display light upward and rightward in the oblique direction. The diffractive reflective element 231 is opposed to the display unit 220 generally in an oblique direction relative to the vertical direction and the horizontal direction. The diffractive reflective element 231 has a surface 232 that is directed downward and in an oblique direction relative to the vertical direction. The diffractive reflective element 235 is placed closer to the projection portion 3a than the diffractive reflective element 231 on the optical path. The diffractive reflective element 235 is located on the front, upper, and right side of the display unit 220. The diffractive reflective element 235 is located on the front and left side of the diffractive reflective element 231. A surface 236 of the diffractive reflective element 235 is directed in an oblique direction backward and upward.

As described above, in the second embodiment, the real image surface 221 of the display unit 220 and the surface 232 of the diffractive reflective element 231 are inclined in both the horizontal direction and the longitudinal direction. Further, in the XY cross section of the diffractive reflective element 231, the configuration causes the display light to enter the diffractive reflective element 231 substantially perpendicularly. Further, in the XY cross section of the diffractive reflective element 235, the configuration causes the display light to enter the diffractive reflective element 235 obliquely at an angle.

As follows, the relationship between the angles θ5 to θ8 defined in the XY cross section shown in FIG. 8 will be described. In the XY cross section of the diffractive reflective element 235, the light having the reference wavelength is reflected by diffraction on the diffractive reflective element 235 toward the projection portion 3a at an emission angle θ5. In addition, in the XY cross section, the light having the reference wavelength enters the diffractive reflective element 235 from the diffractive reflective element 231 at an incident angle θ6. Further, in the XY cross section of the diffractive reflective element 231, a light having a reference wavelength is reflected on the diffractive reflective element 231 by diffraction toward the diffractive reflective element 235 at an emission angle θ7. In addition, in the XY cross section, the light of the reference wavelength from the display unit 220 enters the diffractive reflective element 231 at an incident angle θ8. The angles θ5 to θ8 in the present embodiment are defined with reference to the surfaces 232 and 236.

The light having the reference wavelength reflected at the angles θ5 and θ7 is the first-order diffracted light similar to the light at the angles θ1 and θ3 and can be treated as a light having a wavelength of, for example, the green light.

The light having the reference wavelength is reflected on the diffractive reflective elements 231 and 235 to travel and turns in a U shape in the XY cross section. In this embodiment, the interference fringes of the diffractive reflective element 235 are formed so that the angle θ5 is smaller than the angle θ6. In addition, the interference fringes of the diffractive reflective element 231 are formed so that the angle θ7 is smaller than the angle θ8. In this way, as shown in FIG. 9, the display light having wavelengths causes color shift to spread by reflection on the diffractive reflective element 231 and converges by reflection on the diffractive reflective element 235. For example, the display lights having wavelengths respectively approach to each other to be in parallel. Therefore, the color shift in the horizontal plane direction can be canceled out. Further, the difference between the angles θ6 and θ7 is set small. Therefore, the configuration enables to enhance a cancelling operation of the color offset, that is, to enhance an effect to reduce a chromatic aberration.

Furthermore, in the present embodiment, the angle θ6 is larger than the angle θ5. Therefore, the configuration enables to place the diffractive reflective element 231 at a position away from the front of the diffractive reflective element 235. Thus, the display unit 220 and the diffractive reflective element 235 can be arranged apart from each other so as not to interfere with each other.

In addition, a display light (hereinafter referred to as 0th-order light), which causes regular reflection on the surfaces 232 and 236 without being affected by diffraction, arises in a part of the display light that is incident on each of the diffractive reflective elements 231 and 235.

The 0th-order light reflected on the diffractive reflective element 231 is reflected at the angles θ4 and θ8. The display unit 220 and the diffractive reflective element 235 are placed at positions away from the reflections in the reflection directions at the angles θ4 and θ8. A 0th light processing space ZS is formed between the display unit 220 and the diffractive reflective element 235 that are separated from each other. With this arrangement, the 0th-order light reflected on the diffractive reflective element 231 passes through the 0th-order light processing space ZS and is absorbed by the light-shielding wall portion 11.

The 0th-order light reflected on the diffractive reflective element 235 is reflected at the angles θ2 and θ6. In this configuration, the 0th-order light reflected on the diffractive reflective element 235 is directed to a place other than the projection portion 3a in the windshield 3. The 0th-order light further reflected on the place is directed to the outside of the visual recognition area EB or to the outside of the eyelips.

In this way, the 0th-order light among the display light reflected on the diffractive reflective element 231 and the 0th-order light reflected on the diffractive reflective element 235 are separated out of the optical path.

Figure 10:
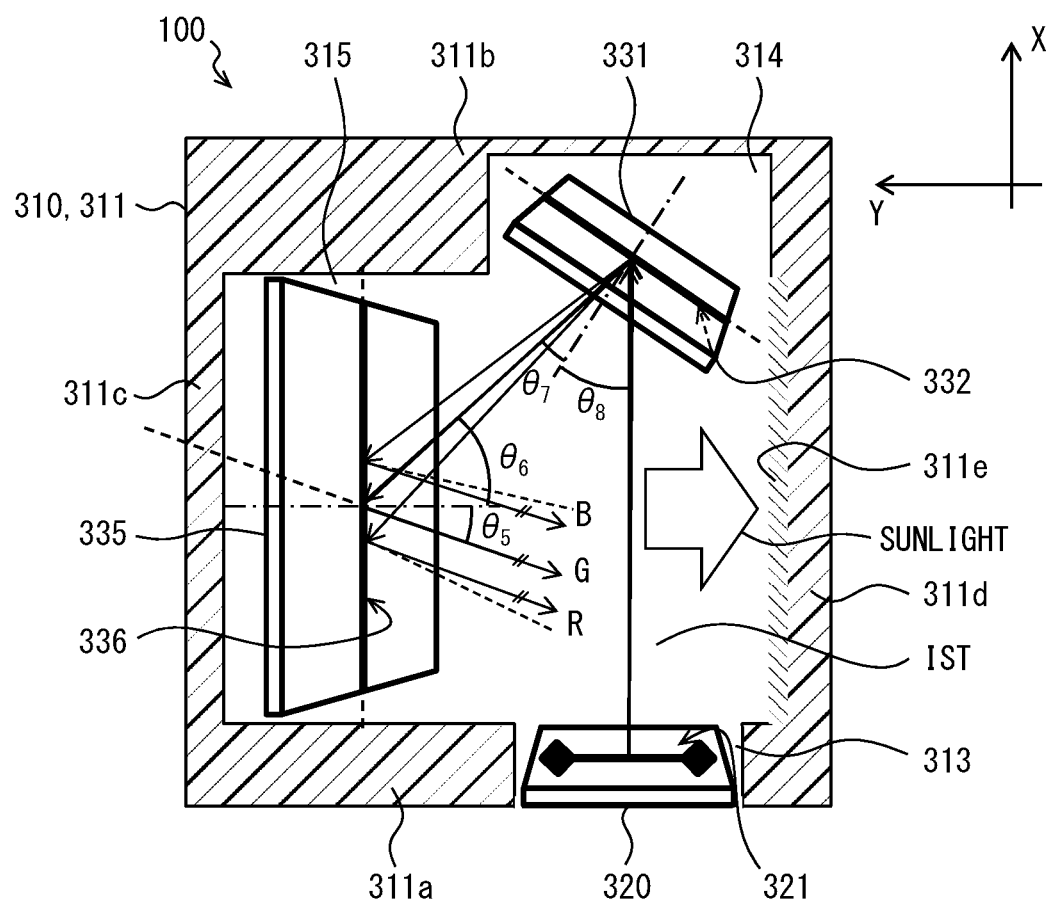
FIG. 10 is a partial sectional view partially and schematically showing an XY plane of an HUD device according to a third embodiment.

In FIG. 10, a display unit 320 and the diffractive reflective elements 331 and 335 show those upper surfaces. The thick lines in the display unit 320 and the diffractive reflective elements 331 and 335 schematically show those cross-sections in the XY cross section. On the other hand, the diffractive reflective element 235 and the case 10 schematically show those cross-sectional shapes in the YZ cross section.

In FIG. 8, the display unit 220 and the diffractive reflective elements 231 and 235 show those the upper surfaces. The thick lines in the display unit 220 and the diffractive reflective elements 231 and 235 schematically show those cross-sections in the XY cross section. Illustration of the case 10 is omitted.

First, according to the second embodiment as described above, the angle θ7 is smaller than the angle θ8 in the reflection of the display light on the diffractive reflective element 231. In short, the angle θ7 is smaller than the angle in the regular reflection. Therefore, in a case where the other wavelength is longer than the reference wavelength, the color shift arises such that the reflection angle of the light of the other wavelength is smaller than θ7. In a case where the other wavelength is shorter than the reference wavelength, the color shift arises such that the reflection angle of the light of the other wavelength is larger than θ7.

Second, the angle θ5 is smaller than the angle θ6 in the reflection of the display light on the diffractive reflective element 235 that is placed closer to the projection portion 3a than the diffractive reflective element 231 on the optical path. In short, the angle θ5 is smaller than the angle in the regular reflection. Therefore, in a case where the other wavelength is longer than the reference wavelength, the color shift arises such that the reflection angle of the light of the other wavelength is smaller than θ5. In a case where the other wavelength is shorter than the reference wavelength, the color shift arises such that the reflection angle of the light of the other wavelength is larger than θ5.

That is, the color shift of the display light having the other wavelength with respect to the display light having the reference wavelength caused in the reflection on the diffractive reflective element 231 and the color shift of the display light having the other wavelength with respect to the display light having the reference wavelength caused in the reflection on the diffractive reflective element 235 are opposite to each other in the color shift direction. Therefore, the chromatic aberration in the cross section along the horizontal plane can be cancelled at least in part on both the reflections on the diffractive reflective elements 231 and 235. Therefore, the chromatic aberration in the horizontal direction can be reduced also in the virtual image VRI. In this way, the visibility of the virtual image VRI can be enhanced.

Further, the angle θ6 is larger than the angle θ5. Therefore, in the reflection of the display light on the diffractive reflective element 235, the optical path width of the display light incident at the angle θ6 can be reduced with respect to the optical path width of the display light reflected at the angle θ5. This compression effect of the optical path width enables to reduce the size of the diffractive reflective element 231 that is placed closer to the display unit 220 than the diffractive reflective element 235 relatively on the optical path. Therefore, the compression effect enables to restrain increase in the size of the HUD device 100 and enhances mountability of the HUD device 100 to the vehicle 1.

As described above, the configuration enables to produce the HUD device 100 satisfying both the mountability to the vehicle 1 and visibility of the virtual image VRI.

Further, according to the second embodiment, the angle θ6 is larger than the angle θ5. Therefore, the configuration enables to place the diffractive reflective element 231 at a position away from the front of the diffractive reflective element 235. Thus, the display unit 220 and the diffractive reflective element 235 can be arranged apart from each other so as not to interfere with each other. Therefore, the display unit 220 need not be placed away from the diffractive reflective element 231. Therefore, the mountability of the HUD device 100 to the vehicle 1 can be enhanced. At the same time, the configuration enables to suppress an optical interference that is caused due to excessive proximity of the display unit 220 to the diffractive reflective element 235. Therefore, visibility of the virtual image VRI can be enhanced.

Further, according to the second embodiment, the display unit 220 and the diffractive reflective element 235 are located at positions away from the reflection of the 0th-order light in the reflection direction in which the display light is reflected on the diffractive reflective element 231. The configuration enables to restrict the 0th-order light of the diffractive reflective element 231 from interfering with the display unit 220 and the diffractive reflective element 235. Thus, the 0th-order light is restricted from being guided through the optical path. In this way, the 0th-order light from the diffractive reflective element 231 can be separated from the optical path. Therefore, the virtual image VRI is hardly affected by the 0th-order light, and the visibility of the virtual image VRI can be enhanced.

Further, according to the second embodiment, the diffractive reflective element 235 reflects the 0th-order light among the display light toward the outside of the visual recognition area EB, i.e., toward the outside of the apparatus. The configuration enables to restrict the 0th-order light, which is from the diffractive reflective element 235, from being recognized together with the virtual image VRI in the visual recognition area EB, thereby to enhance the visibility of the virtual image VRI.

Third Embodiment

As shown in FIG. 10, a third embodiment is a modification of the second embodiment. The third embodiment will be described mainly on configurations different from those of the second embodiment.

A case 310 of the third embodiment has an accommodation part 313 defined by a wall portion 311 for placing the display unit 320. In addition, the case 310 has an accommodation part 314 for placing a diffractive reflective element 331 that is closer to the display unit 320 than the diffractive reflective element 335 on the optical path.

The accommodation part 313 and the accommodation part 314 are opposed in an opposing direction on both sides of the internal space IS. In this embodiment, the opposing direction is the horizontal direction.

The accommodation part 313 is formed in a through hole shape that penetrates the wall portion 311 on the left side of the case 310. The display unit 320 is placed such that a real image surface 321 faces the internal space IS and closes the accommodation part 313. More specifically, the real image surface 321 placed in the accommodation part 313 is directed in an oblique direction upward and in the horizontal direction, in other words, in a direction toward the diffractive reflective element 331. A portion of the display unit 320 on the opposite side of the real image surface 321 is exposed to the outside of the device. The configuration enables to effectively dissipate heat generated by the display unit 320 to the outside of the device.

The accommodation part 314 is formed on the right side of the wall portion 311b of the case 310. The accommodation part 314 is in a bottomed recessed hole shape that is recessed from the inner space IS to the outside of the device. A surface 332 of the diffractive reflective element 331 is directed toward the internal space IS. More specifically, the surface 332 placed in the accommodation part 314 is directed in an oblique direction toward the front, lower, and left.

In this arrangement, according to the third embodiment, the angle $\theta 7$ is set smaller than the angle $\theta 8$ in the XY cross section of the diffractive reflective element 331. For example, the sum of the angles $\theta 6$, $\theta 7$, and $\theta 8$ is set to about 90 degrees.

Further, the case 310 of the third embodiment has an accommodation part 315 for placing the diffractive reflective element 335 at a wall portion 311c on the front side. The accommodation part 315 is located at a position shifted with respect to an opposed space IST in a direction perpendicular to the opposing direction. The opposed space IST is interposed between the display unit 320 and the diffractive reflective element 331. The opposed space IST is formed by the accommodation part 313 and the accommodation part 314 opposed each other in the internal space IS. In this embodiment, the accommodation part 315 is located at a position shifted on the front side of the opposed space IST. The surface 336 of the diffractive reflective element 335 is directed in an oblique direction upward and backward. The angle $\theta 6$ is also set to about 45 degrees.

Therefore, in the XY cross section, the surface 336 of the diffractive reflective element 335 is directed to be substantially perpendicular to the real image plane 321 of the display unit 320 and the surface 332 of the diffractive reflective element 331. An external light treatment portion 311e is provided at a position shifted rearward from the opposing space IST, that is, at a position opposed to the diffractive reflective element 335 in the longitudinal direction (front-rear direction). The external light treatment portion 311e is placed on the wall portion 311d on the rear side of the case 310. When external light such as sunlight passes through the windshield 3 from the upper side to the lower side and enters the diffractive reflective element 335 in the case 310 through the window portion 12, the external light is at least in part causes regular reflection on the surface 336 without being exerted with diffraction. In this state, the external light changes in direction to be directed rearward and is incident on the external light treatment portion 311e. The external light treatment portion 311e is, for example, produced by forming the surface of the wall portion 311d into a rough surface by embossing or the like, by attaching a felt to the surface, or by applying a paint that absorbs external light to the surface. In those ways, the external light treatment portion 311e is formed such that its absorption rate or its diffusion rate of the external light is increased.

Herein, a light that travels in a direction opposite to the direction of the display light from the projection portion 3a along the optical path through the light guide unit 30 is defined as a virtual light. The virtual light enters the diffractive reflective element 335 at incident angles $\theta 1$ and $\theta 5$. In this case, the virtual light in part contains a zero-order light that causes regular reflection on the surfaces 232 and 236 without being affected by diffraction. The 0th-order light of the virtual ray is reflected on the diffractive reflective element 335 at emission angles of $\theta 1$ and $\theta 5$. In this embodiment, the display unit 320 and the diffractive reflective element 331 are placed at positions that avoids the 0th-order light of the virtual light as reflected in the reflection direction. The external light treatment portion 311e is located at the position on the path of the 0th-order light of the virtual light in the reflection direction.

In FIG. 10, the display unit 320 and the diffractive reflective elements 331 and 335 show those upper surfaces. The thick lines in the display unit 320 and the diffractive reflective elements 331 and 335 schematically show those cross-sections in the XY cross section. The case 310 schematically shows its cross section in the YZ cross section.

Further, according to the third embodiment, the display unit 320 and the diffractive reflective element 335 are located at positions away from the reflection of the 0th-order light in the reflection direction in which the virtual light is reflected on the diffractive reflective element 331. According to this configuration, even when external light such as sunlight enters the optical path to travel backward along the optical path, the external light is restricted from being guided along the optical path toward the projection portion 3a due to interference with the display unit 320 or the diffractive reflective element 331. Therefore, the configuration enables to exclude the external light from the optical path. Therefore, the virtual image VRI is hardly affected by the external light, and the visibility of the virtual image VRI can be enhanced.

Further, according to the third embodiment, the wall portion 311d is located in the reflection direction of the 0th-order light reflected on the diffractive reflective element 335 with respect to the diffractive reflective element 335. The external light processing unit 311e treats the external light incident from the outside of the device by causing at least one of absorption and diffusion. In this configuration, the external light processing unit 311e treats the external light, thereby to enable to restrict the external light from being reflected in the case 10 and from returning to the optical path. Therefore, the virtual image VRI is hardly affected by the external light, and the visibility of the virtual image VRI can be enhanced.

Other Embodiments

Although multiple embodiments have been described above, the present disclosure is not construed as being limited to these embodiments, and can be applied to various embodiments and combinations within a scope that does not depart from the gist of the present disclosure.

Specifically, as a first modification, each of the diffractive reflective elements 31 and 35 may not be a hologram element produced by exposure to light. For example, the diffractive optical element may be an element that has a refractive index distribution in a medium produced by a method other than the exposure to light. In addition, the diffractive reflective element 31 and 35 may be materialized with, for example, a diffractive grating having a mechanical structure defining, for example, protrusions and recesses.

According to a second modification, each of the diffractive reflective elements 31 and 35 may be formed in a curved plate shape, other than the flat plate shape, having, for example, a smooth curved surface 32 and 36.

As a third modification, the diffractive reflective elements 31 and 35 may have a positive optical power or a negative optical power.

As a fourth modification, a lens, a mirror, a prism, a polarizing plate, a retardation plate, an optical filter, and the like may be added to the light guide unit 30 to exhibit the effect of canceling the color shift with the diffractive reflective elements 31 and 35.

As a fifth modification, the arrangement of the display unit 20 and the diffractive reflective elements 31 and 35 and the like may be modified from that of the first to third embodiments by for example, replacing those components back and forth, replacing those components left and right, rotating the entirety of the components, and the like. The arrangement of those components may modified suitably in accordance with the positional relationship of the HUD device 100 and the projection portion 3a.

As a sixth modification, a wavelength other than the wavelength of green light may be selected as the reference wavelength. For example, in a configuration where the display unit 20 emits a display light that is a combination of the red light, the green light, and the blue light, the wavelength of the red light or the wavelength of the blue light may be selected as the reference wavelength. In a configuration where the display unit 20 emits a display light that is a combination of the red light and the blue light, the wavelength of the red light or the wavelength of the blue light may be selected as the reference wavelength. In a configuration where the display unit 20 emits the white light, a wavelength included in the white light may be selected as the reference wavelength. As long as the above relationships where that the angle θ1 is smaller than the angle θ2 and where the angle θ3 is larger than the angle θ4 are satisfied with respect to not all the wavelengths included in the display light but to one reference wavelength included in the display light, mountability of the device to the vehicle 1 can be enhanced. In addition, the visibility of the virtual image VRI can be enhanced.

As a seventh modification related to the first embodiment, the angle θ2 may be set to equal to or be larger than the angle θ3.

As an eighth modification related to the second embodiment, at least one of the 0th-order light reflected on the diffractive reflective element 231 and the 0th-order light reflected on the diffractive reflective element 235 may remain in the optical path.

As a ninth modification related to the third embodiment, the accommodation part 313 may be in a bottomed and recessed shape. The accommodation part 314 may be in a through-hole shape.

As a tenth modification related to the second and third embodiments, as long as the relationships of the angles θ5 to θ8 where angle θ7 is smaller than the angles θ8 and where the angle θ5 is smaller than the angle θ6 are satisfied, the relationships of the angles θ1 to θ4 where the angle θ1 is smaller than the angle θ2 and where the angle θ3 is larger than the angle θ4 may not be satisfied.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A virtual image display device configured to be mounted on a vehicle and to project an image on a projection portion to display the image as a virtual image to be visible, the virtual image display device comprising:
   a display unit configured to emit a display light of the image including a light having a reference wavelength and a light having a wavelength different from the reference wavelength; and
   a light guide unit configured to form an optical path that guides the display light emitted from the display unit toward the projection portion, wherein
   the light guide unit includes:
   a projection-portion-side diffractive reflective element placed on the optical path and configured to reflect the display light toward the projection portion by causing diffraction such that an incident angle and an emission angle of the display light are different from each other; and
   a display-unit-side diffractive reflective element placed between the display unit and the projection-portion-side diffractive reflective element on the optical path, wherein
   the display-unit-side diffractive reflective element is configured to reflect the display light from the display unit toward the projection-portion-side diffractive reflective element by causing diffraction such that an incident angle and an emission angle of the display light are different from each other,
   in a cross section taken along a vertical plane of the vehicle,
      an emission angle of a light having the reference wavelength reflected on the projection-portion-side diffractive reflective element with diffraction toward the projection portion is defined as an angle θ1,
      an incident angle of the light having the reference wavelength incident on the projection-portion-side diffractive reflective element from the display-unit-side diffractive reflective element is defined as an angle θ2,
      an emission angle of the light having the reference wavelength reflected on the display-unit-side diffractive reflective element with diffraction toward the projection-portion-side diffractive reflective element is defined as an angle θ3, and
      an incident angle of the light having the reference wavelength incident on the display-unit-side diffractive reflective element from the display unit is defined as θ4,
   the angle θ1 is smaller than the angle θ2, and the angle θ3 is larger than the angle θ4,
   the angle θ1 and the angle θ2 are on opposite sides with respect to a normal line of a surface of the projection-portion-side diffractive reflective element, and
   the angle θ3 and the angle θ4 are on opposite sides with respect to a normal line of a surface of the display-unit-side diffractive reflective element, in a cross section taken along a horizontal plane of the vehicle,
an emission angle of a light having the reference wavelength reflected on the projection-portion-side diffractive reflective element with diffraction toward the projection portion is defined as an angle θ5,
an incident angle of the light having the reference wavelength incident on the projection-portion-side diffractive reflective element from the display-unit-side diffractive reflective element is defined as an angle θ6,
an emission angle of the light having the reference wavelength reflected on the display-unit-side diffractive reflective element with diffraction toward the projection-portion-side diffractive reflective element is defined as an angle θ7,
an incident angle of the light having the reference wavelength incident on the display-unit-side diffractive reflective element from the display unit is defined as θ8, and
the angle θ5 and the angle θ6 are on opposite sides with respect to the normal line of a surface of the projection-portion-side diffractive reflective element,
the angle θ7 and the angle θ8 are on opposite sides with respect to the normal line of a surface of the display-unit-side diffractive reflective element, and
the angle θ5 is smaller than the angle θ6, and the angle θ7 is smaller than the angle θ8.

2. The virtual image display device according to claim 1, wherein the angle θ2 is smaller than the angle θ3.

3. The virtual image display device according to claim 1, wherein
the display unit and the projection-portion-side diffractive reflective element are placed, with respect to the display-unit-side diffractive reflective element, at positions that avoid a reflection direction of a zero-order light included in the display light reflected on the display-unit-side diffractive reflective element.

4. The virtual image display device according to claim 1, wherein
the projection-portion-side diffractive reflective element reflects a 0th-order light included in the display light to an outside of the virtual image display device that is outside of a visual recognition area where the virtual image is visually recognizable.

5. The virtual image display device according to claim 1, wherein
a light that travels from the projection portion along the optical path in a direction opposite to the display light is defined as a virtual light,
the display unit and the display-unit-side diffractive reflective element are placed, with respect to the projection-portion-side diffractive reflective element, at positions that avoid a reflection direction of a zero-order light included in the virtual light reflected on the projection-portion-side diffractive reflective element.

6. The virtual image display device according to claim 5, further comprising:
a case accommodating the display unit, the display-unit-side diffractive reflective element, and the projection-portion-side diffractive reflective element, wherein
the case has an external light treatment portion placed, with respect to the projection-portion-side diffractive reflective element, at a position in a reflection direction of the zero-order light included in the virtual light reflected on the projection-portion-side diffractive reflective element, and the external light treatment portion is configured to treat an external light incident from an outside of the virtual image display device by at least one of absorption and diffusion.

7. The virtual image display device according to claim 1, wherein the horizontal plane is perpendicular to the vertical plane.

8. A virtual image display device configured to be mounted on a vehicle and to project an image on a projection portion to display the image as a virtual image to be visible, the virtual image display device comprising:
a display unit configured to emit a display light of the image including a light having a reference wavelength and a light having a wavelength different from the reference wavelength; and
a light guide unit configured to form an optical path that guides the display light emitted from the display unit toward the projection portion, wherein
the light guide unit includes:
a projection-portion-side diffractive reflective element placed on the optical path and configured to reflect the display light toward the projection portion by causing diffraction such that an incident angle and an emission angle of the display light are different from each other; and
a display-unit-side diffractive reflective element placed between the display unit and the projection-portion-side diffractive reflective element on the optical path, wherein
the display-unit-side diffractive reflective element is configured to reflect the display light from the display unit toward the projection-portion-side diffractive reflective element by causing diffraction such that an incident angle and an emission angle of the display light are different from each other,
in a cross section taken along a vertical plane of the vehicle,
an emission angle of a light having the reference wavelength reflected on the projection-portion-side diffractive reflective element with diffraction toward the projection portion is defined as an angle θ1,
an incident angle of the light having the reference wavelength incident on the projection-portion-side diffractive reflective element from the display-unit-side diffractive reflective element is defined as an angle θ2,
an emission angle of the light having the reference wavelength reflected on the display-unit-side diffractive reflective element with diffraction toward the projection-portion-side diffractive reflective element is defined as an angle θ3, and
an incident angle of the light having the reference wavelength incident on the display-unit-side diffractive reflective element from the display unit is defined as θ4,
the angle θ1 is smaller than the angle θ2, and the angle θ3 is larger than the angle θ4,
the angle θ1 and the angle θ2 are on opposite sides with respect to a normal line of a surface of the projection-portion-side diffractive reflective element, and
the angle θ3 and the angle θ4 are on opposite sides with respect to a normal line of a surface of the display-unit-side diffractive reflective element,
in a cross section taken along a horizontal plane of the vehicle,
an emission angle of a light having the reference wavelength reflected on the projection-portion-side diffractive reflective element with diffraction toward the projection portion is defined as an angle $\theta 5$, an incident angle of the light having the reference wavelength incident on the projection-portion-side diffractive reflective element from the display-unit-side diffractive reflective element is defined as an angle $\theta 6$, an emission angle of the light having the reference wavelength reflected on the display-unit-side diffractive reflective element with diffraction toward the projection-portion-side diffractive reflective element is defined as an angle $\theta 7$, an incident angle of the light having the reference wavelength incident on the display-unit-side diffractive reflective element from the display unit is defined as $\theta 8$, the angle $\theta 5$ and the angle $\theta 6$ are on opposite sides with respect to the normal line of the surface of the projection-portion-side diffractive reflective element, and the angle $\theta 7$ and the angle $\theta 8$ are on opposite sides with respect to the normal line of the surface of the display-unit-side diffractive reflective element, the angle $\theta 5$ is smaller than the angle $\theta 6$, and the angle $\theta 7$ is smaller than the angle $\theta 8$, and the angle $\theta 2$ is smaller than the angle $\theta 3$.

9. The virtual image display device according to claim 8, wherein the horizontal plane is perpendicular to the vertical plane.

\* \* \* \* \*